Fig. 1.

INVENTORS
ROBERT J. ZOSCHAK
KELVIN J. RAY
BY
ATTORNEY

Fig. 2.

INVENTORS
ROBERT J. ZOSCHAK
KELVIN J. RAY
BY
ATTORNEY

INVENTORS
ROBERT J. ZOSCHAK
KELVIN J. RAY
BY
Arthur Frederick
ATTORNEY

Fig. 6.

United States Patent Office
2,946,187
Patented July 26, 1960

2,946,187

GAS AND STEAM CYCLE POWER PLANT HAVING TWIN SUPERCHARGED VAPOR GENERATORS

Robert J. Zoschak, Rutherford, and Kelvin J. Ray, Ramsey, N.J., assignors to Foster Wheeler Corporation, New York, N.Y., a corporation of New York Filed May 28, 1958, Ser. No. 738,385

8 Claims. (Cl. 60—39.18)

This invention relates to gas and steam cycle power plants and more particularly to a gas and steam cycle power plant having twin supercharged vapor generators and the means and method for controlling operation of such power plant to achieve high efficiency and flexibility of operation over a wide load range.

In conventional type steam generators, internal gas pressures are substantially at atmospheric pressure, while in supercharged vapor generators the internal gas pressures are relatively high, as for example, 75 p.s.i.g. In order to withstand the relatively high internal pressures, the setting of supercharged vapor generators are generally cylindrical in shape. Heretofore supercharged vapor generators having cylindrical settings have been provided with superheater and/or reheater units of complicated and expensive helically formed tube banks. Such superheater and reheater constructions also present problems of maintenance and repair. The present invention overcomes the aforesaid problems by providing a rectangular convection gas passage in the upper part of the setting which permits installation of superheater and reheater units of simple, inexpensive construction. The problem of maintenance and repair is solved in the present invention by the novel arrangement of the reheater and superheater tubes and by providing an access opening in the setting of such size that removal and replacement of the superheater and/or reheater unit from the setting can be easily accomplished without the necessity of disturbing other pressure parts.

Investigations into combined gas and steam cycle power plant constructions, utilizing supercharged steam generators, has shown that such plants are substantially more efficient than conventional steam cycle power plants operating under equivalent steam conditions, and, therefore, are commercially more desirable than conventional power plants. In combined gas and steam cycle power plants, it is not only necessary for maximum efficiency and flexibility of operation to maintain superheat and reheat final steam temperatures at predetermined maximum values over a wide load range, as in conventional vapor generating power plants, but it is also essential to maintain the temperature and the mass flow of the combustion gas, at the gas turbine inlet, at predetermined maximum values over a wide load range. The maintenance of the combustion gas temperature and mass flow thereof at predetermined values at the turbine inlet over as wide a range of load as possible is most important since the plant efficiency is highest when the power output of the gas turbine is at its designed maximum value. Since the gas turbine drives an air compressor which supplies combustion air under pressure to the vapor generators, the control of the aforementioned factors, because of their interdependence on one another, presents a rather complex problem.

It is, therefore, an object of the present invention to provide a gas-steam cycle power plant wherein final superheat steam and final reheat steam temperatures, as well as combustion gas temperature and mass flow thereof at the gas turbine inlet, are maintained at predetermined maximum values over an extremely wide plant load range.

Accordingly, the present invention provides a novel gas-steam cycle power plant comprising dual or twin supercharged vapor generators having a common combustion gas duct for conducting combustion gas to a gas turbine and which vapor generators are connected to deliver steam to steam turbines. One of the vapor generators is provided with a primary convection superheater and a reheater while the other vapor generator is provided with a secondary convection superheater, the latter being connected to receive superheated steam from the superheater in the first mentioned vapor generator. An afterburner is provided in the combustion gas duct which is fired to maintain the temperature of the combustion gas at the gas turbine inlet at a predetermined maximum value. Combustion air under pressure is delivered to each of the burners of the vapor generators from an air compressor coupled to the gas turbine. The gas turbine is also connected to an output member, such as an electric generator. The heat transfer surfaces or steam pressure parts of the vapor generators are constructed and arranged so that, at full load demand on the power plant with equal fuel load and equal combustion air flow to each of the furnaces of the two vapor generators, superheat and reheat steam temperatures are maintained at predetermined maximum values. Under these operating conditions, the combustion gas flowing to the gas turbine is at a temperature slightly below the desired predetermined maximum temperature value. Sufficient fuel and air is delivered to the afterburner for combustion therein to elevate the combustion gas to the desired maximum temperature value at the inlet of the gas turbine.

Under reduced load on the power plant, the fuel load to the burners of the vapor generators is reduced to allow for the reduced steam demand but the air to fuel ratio is increased in each of the vapor generators to increase mass flow of combustion gas across the reheater and superheater sections and thereby maintain superheat and reheat steam temperatures at the predetermined maximum values. Although the air to fuel ratio is increased, the total air flow to the furnaces will be less than at full load and the combustion gas temperature at the afterburner will fall below the predetermined value. To maintain combustion gas temperature at the gas turbine inlet at the predetermined maximum value, fuel and combustion air load to the afterburner is increased to thereby raise the combustion gas to the maximum temperature value at the gas turbine inlet.

Under reduced plant load and where combustion air to each of the vapor generators is consequently reduced and where increased fuel and air load to the afterburner is insufficient to maintain the mass flow of combustion gas at the inlet of the gas turbine at the predetermined maximum value, a portion of the combustion air passing from the compressor to the vapor generators is diverted into the combustion gas duct upstream of the afterburner in amounts responsive to the change in differential pressure between the combustion gas at the gas turbine inlet and the combustion air pressure at the compressor outlet. By passing combustion air in proportion to the reduced combustion air flow to the vapor generators, a constant mass flow of combustion gas of predetermined maximum value at the gas turbine inlet is maintained.

The invention will be more fully understood from the following detailed description thereof when considered in connection with the accompanying drawings and in which.

Referring to the drawings and more particularly to Figs. 1, 2 and 2A, 10 generally designates the gas-steam cycle power plant according to this invention which comprises two supercharged vapor generators 11 and 12, having a common vapor and liquid drum 13, and connected to a gas turbine and compressor assembly 14 (Figs. 7 and 8) through a common combustion gas duct 15. The vapor generators 11 and 12 are also connected to deliver superheated steam and reheated steam to steam turbines (not shown).

Vapor generator 11 comprises an elongated cylindrical shell or setting consisting of a refractory wall 16 covered by a fluid-tight metal casing 17. The setting is supported to extend vertically and in spaced relationship with a foundation 18 by a plurality of spaced vertically extending support columns 19 and horizontal beams 20 (Figs. 1, 7 and 8) which extend between and are connected to support columns 19. The vapor generator shell is provided with a bottom 21 (Fig. 2A) and a slightly reduced top portion 22 (Fig. 2) which is provided with a relatively large circular access opening 23. Access opening 23 is closed by a closure cap 24 which is secured to the top portion 22 of the shell in a fluid-tight manner.

Figure 2:
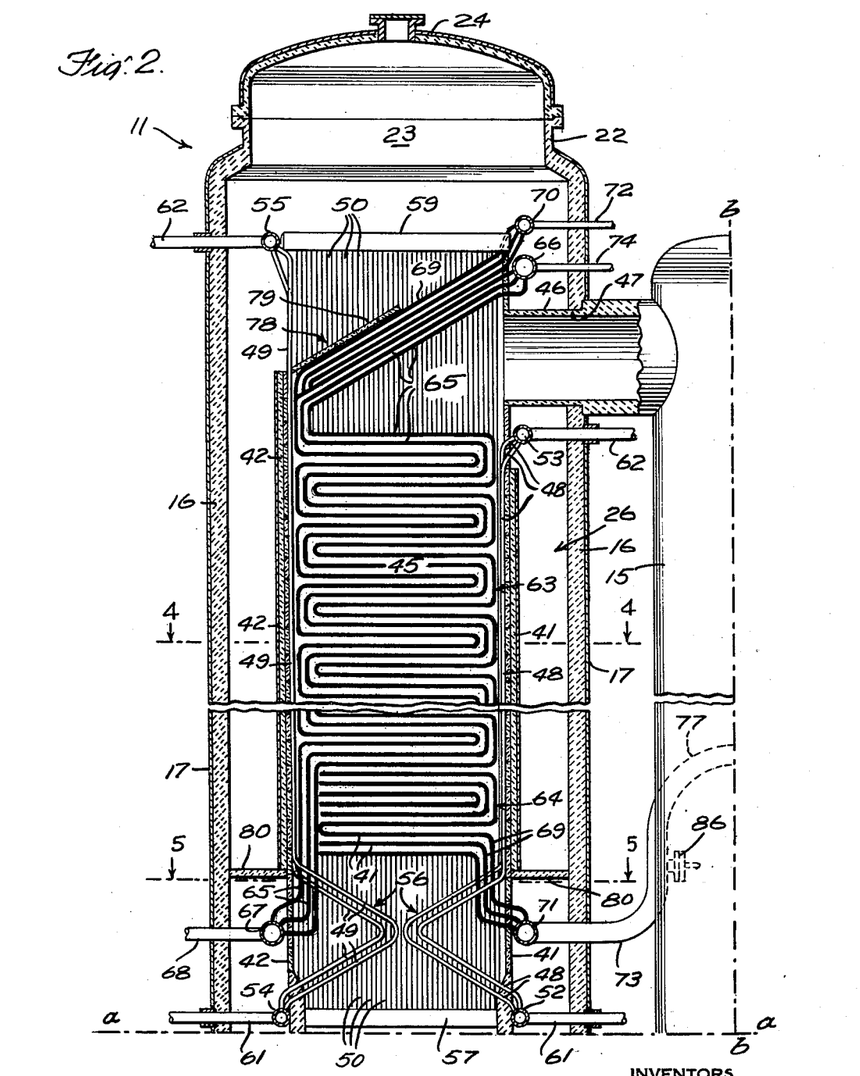
Fig. 2 is a longitudinal view in section of the upper part of the primary superheater vapor generator joined to Fig. 2A on line a—a.

The interior of vapor generator 11 is divided into two sections, the lower portion being a radiant furnace section 25 (Fig. 2A) and the upper portion a convection section 26 (Fig. 2).

Figure 2A:
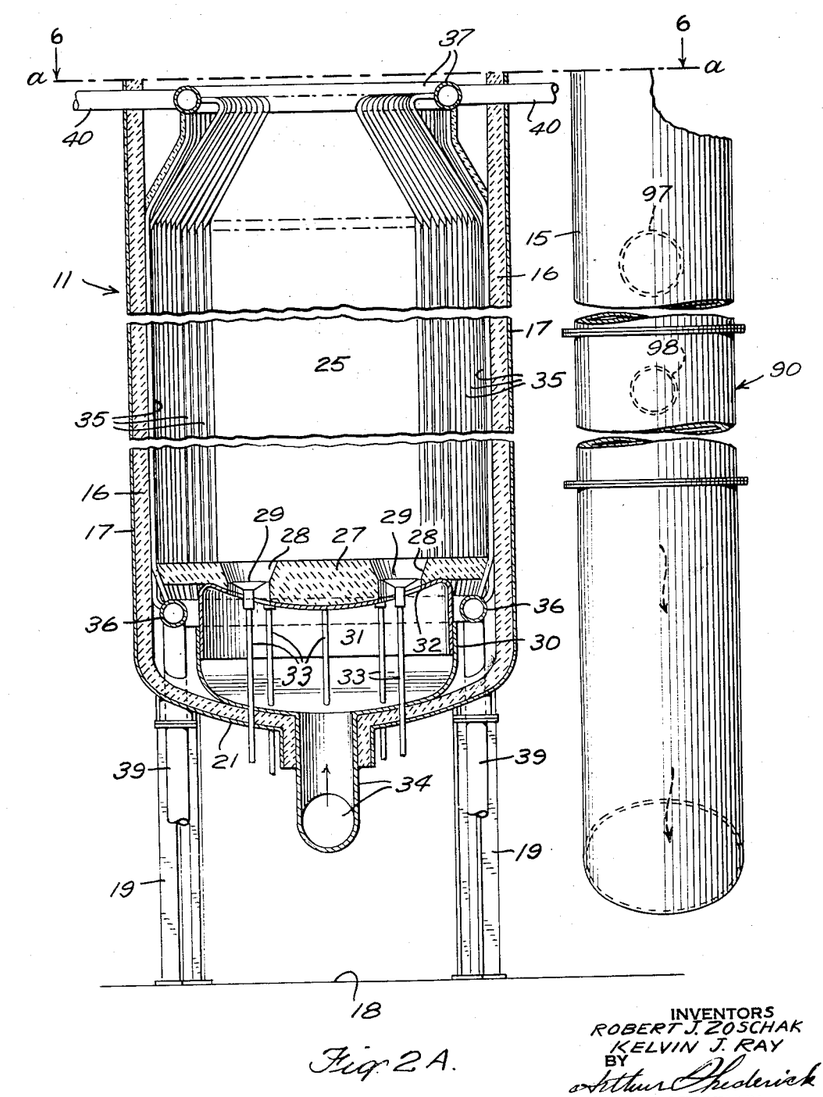
Fig. 2A is a longitudinal sectional view of the lower part of the primary superheater vapor generator joined to Fig. 2 on line a—a.

As best shown in Fig. 2A, radiant furnace section 25 is provided with a horizontal floor 27 which is disposed in relatively close spaced relationship to bottom 21. Floor 27 has a plurality of circumferentially arranged burner ports 28 through which fuel burners 29 emit fuel for combustion in furnace chamber 25. A metallic casing 30, forming a plenum chamber 31 therein, is disposed between bottom 21 and floor 27. Casing 30 is provided with openings 32 which register with burner ports 28 in floor 27. Fuel is supplied to each of the burners 29 by a feed pipe 33 which extends through bottom 21 of the vapor generator setting. A combustion air feed pipe 34 communicates with plenum chamber 31 through setting bottom 21, to supply combustion air under relatively high pressure, as for example 75 p.s.i.g., to plenum chamber 31. The combustion air passes from plenum chamber 31 through openings 32 and burner ports 28, into admixture with the fuel emitted from burners 29 into furnace chamber 25. Since there would be a pressure differential across floor 27 if combustion air was introduced into the space between floor 27 and bottom 21, floor 27 would have to be of reinforced construction to withstand that differential pressure. However, casing 30 eliminates the requirement for a reinforced floor construction by absorbing and relieving the floor of that pressure differential.

Figure 1:
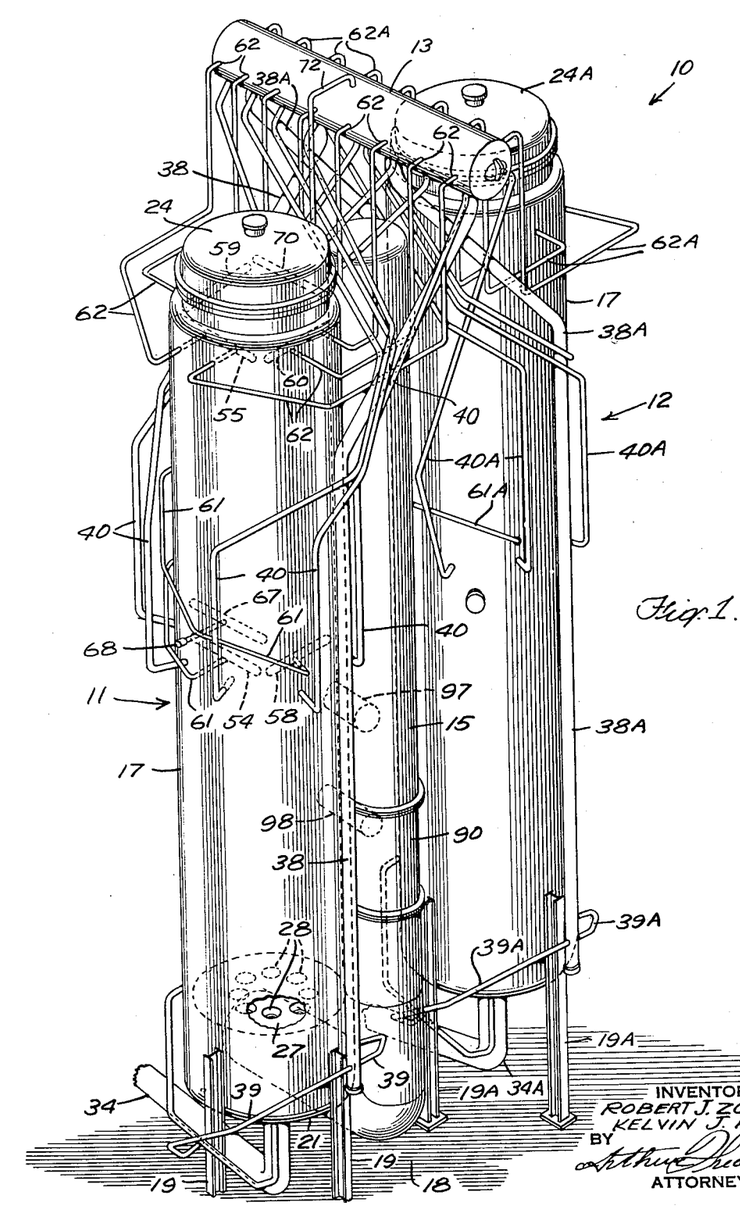
Fig. 1 is a perspective view in elevation of the supercharged vapor generators of the present invention.

Refractory wall 16 in furnace chamber 25 is lined by tangentially disposed vapor generating tubes 35. Tubes 35 extend vertically from a ring-shaped inlet header 36 which is disposed below floor 27 to a ring-shaped outlet header 37 disposed in the upper part of radiant furnace chamber 25. As shown in Fig. 1, water is supplied to inlet header 36 from the vapor and liquid drum 13, by a pair of downcomers 38 (see Figs. 1 and 7) and distribution pipes 39 which extend through setting bottom 21 and are connected at one end to the lower portions of downcomers 38 and at the opposite end to inlet header 36. Saturated steam generated in tubes 35 flows from outlet header 37 into a plurality of riser pipes 40. Riser pipes 40 project through the vapor generator setting and extend upwardly exteriorly of the setting and are connected to liquid and vapor drum 13.

Figure 4:
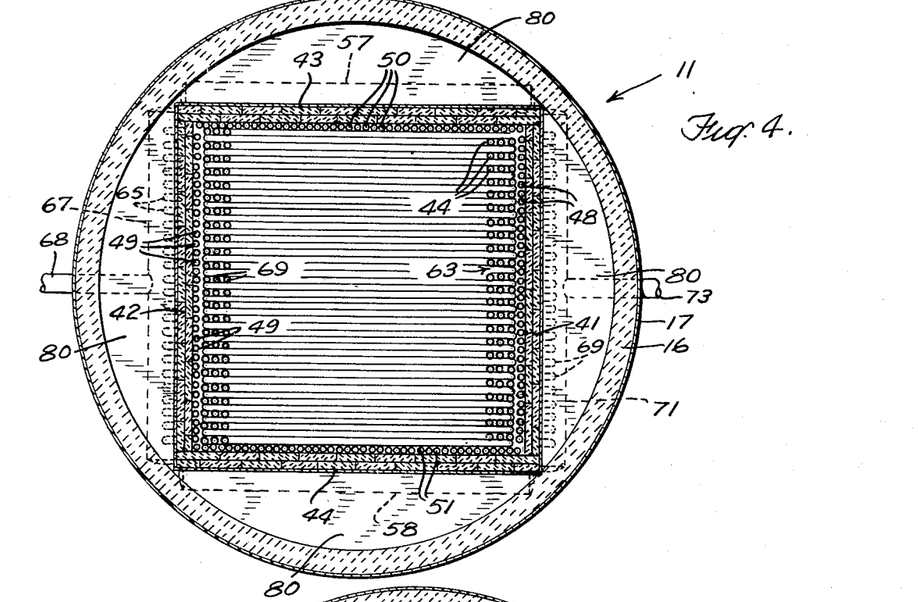
Fig. 4 is a transverse sectional view taken along line 4—4 of Fig. 2.
Figure 5:
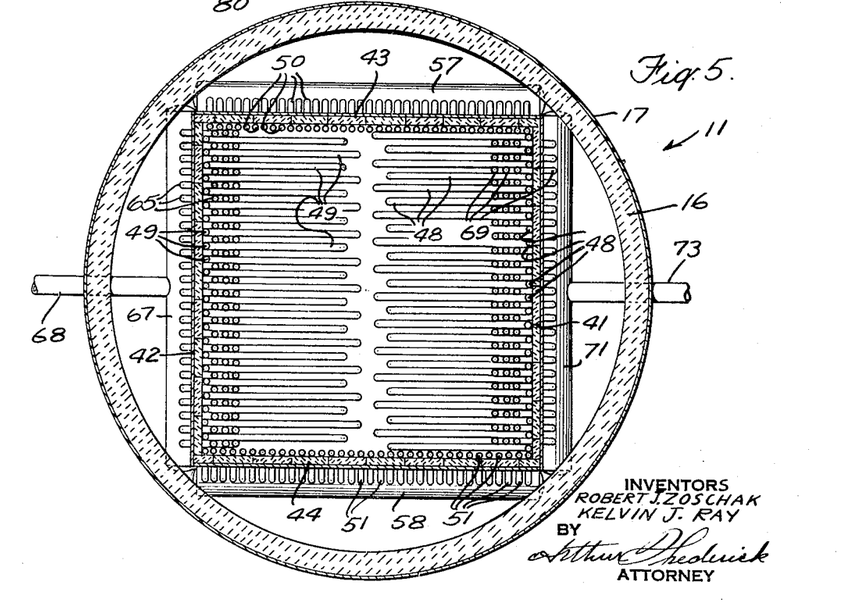
Fig. 5 is a transverse sectional view taken substantially along line 5—5 of Fig. 2.
Figure 6:
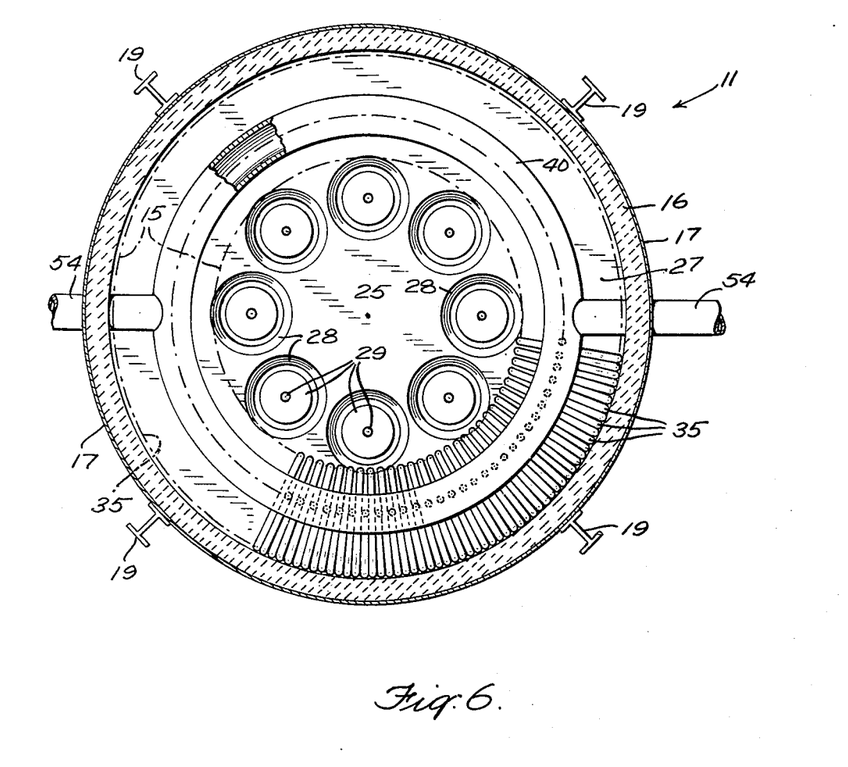
Fig. 6 is a transverse view in section taken along line 6—6 of Fig. 2A.

As shown in Figs. 2, 4, and 5, four refractory walls, 41, 42, 43 and 44 are disposed within the setting of vapor generator 11 in convection section 26. Walls 41, 42, 43 and 44 are secured together in a fluid-tight manner at right angles to each other to define therebetween a rectilinear convection passageway 45 which communicates at one end with furnace chamber 25. Each of the walls extend from a point in spaced relationship with outlet header 37 (Fig. 2A) upwardly to a point in spaced relationship to upper portion 22 of the setting or shell. Wall 41 adjacent its upper end is provided with an opening in which is secured a combustion gas outlet duct 46 which duct 46 extends through an opening 47 in the setting or shell of the vapor generator and is connected to the vertically extending portion of combustion gas duct 15.

Figure 7:
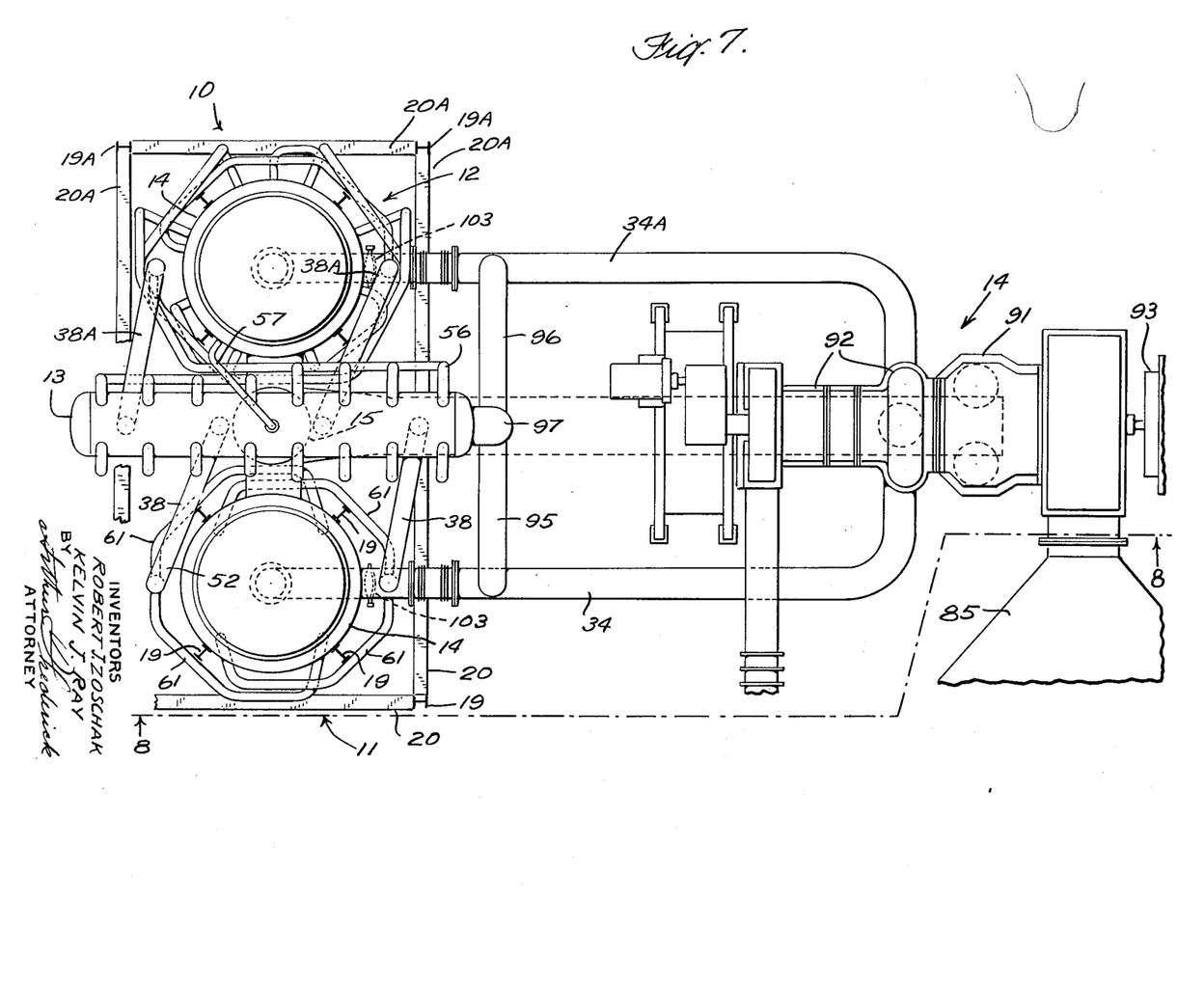
Fig. 7 is a plan view of the steam and gas cycle power plant according to this invention showing the connections between the supercharged vapor generators and the gas turbine and compressor assembly.

Walls 41, 42, 43 and 44 are lined by a bank of vapor generating tubes 48, 49, 50 and 51, respectively. Each of the tubes 48 is connected at one end to an inlet header 52, which header is disposed below wall 41 and extends horizontally and parallel thereto. The opposite ends of tubes 48 are connected to a horizontally disposed outlet header 53, which header is positioned below duct 46 and between wall 48 at the refractory wall 16 of the setting. Tubes 49 are connected at one end to an inlet header 54 which inlet header is disposed below wall 42 opposite from inlet header 52 and at the opposite end are connected to an outlet header 55. Tubes 48 at their lower ends extend from header 52 upwardly and inwardly toward the center line of convection passageway 45 and then away from the center line of the latter to wall 48 while tubes 49 at their lower ends extend from header 54 upwardly and inwardly toward the center line of the convection passageway 45 and then away from the center line of the latter to wall 49 whereby tubes 48 and 49 provide a slag screen 56. Tubes 50 and 51, adjacent walls 43 and 44, are connected to inlet headers 57 and 58, respectively, which headers are horizontally disposed below and parallel to walls 43 and 44. Tubes 50 and 51 extend upwardly from headers 57 and 58 along the respective walls 43 and 44 and are connected to outlet headers 59 and 60, respectively, which headers are arranged in the same horizontal plane as outlet header 55. As shown in Figs. 2 and 7, water is supplied to inlet headers 52, 54, 57 and 58 by a plurality of distribution lines 61 which are connected to downcomers 38 and to inlet headers 52, 54, 57 and 58. A plurality of riser lines 62 are connected to outlet headers 53, 55, 59 and 60 and project through wall 16 and casing 17 of the setting and are connected to the vapor and liquid drum 13 (see Fig. 1) to conduct saturated steam and water mixture from outlet headers 53, 55, 59 and 60 to the former.

Within convection passageway 45 is disposed a reheater 63, and below the reheater, a superheater 64. Reheater 63 comprises a plurality of horizontally spaced parallel rows of tubes 65 which are connected to an outlet header 66. Header 66 is disposed above outlet gas duct 46 adjacent wall 41. Tubes 65 extend from outlet header 66, through wall 41, downwardly across the top of convection passageway 45 and thence downwardly parallel to wall 42 to a point slightly below the level of outlet gas duct 46. The tubes are then formed into a plurality of horizontally extending, vertically spaced, straight portions serially connected together by return bend portions. The lower portions of reheater tubes 65 extend downwardly parallel to wall 42, between tubes 49, and then through wall 42 to an inlet header 67. Steam to be reheated is supplied to reheater inlet header 67 by means of a pipe 68 while reheater outlet header 66 is connected by a suitable line 74 (Figs. 2 and 9) to a place of use, such as a steam turbine.

Figure 3:
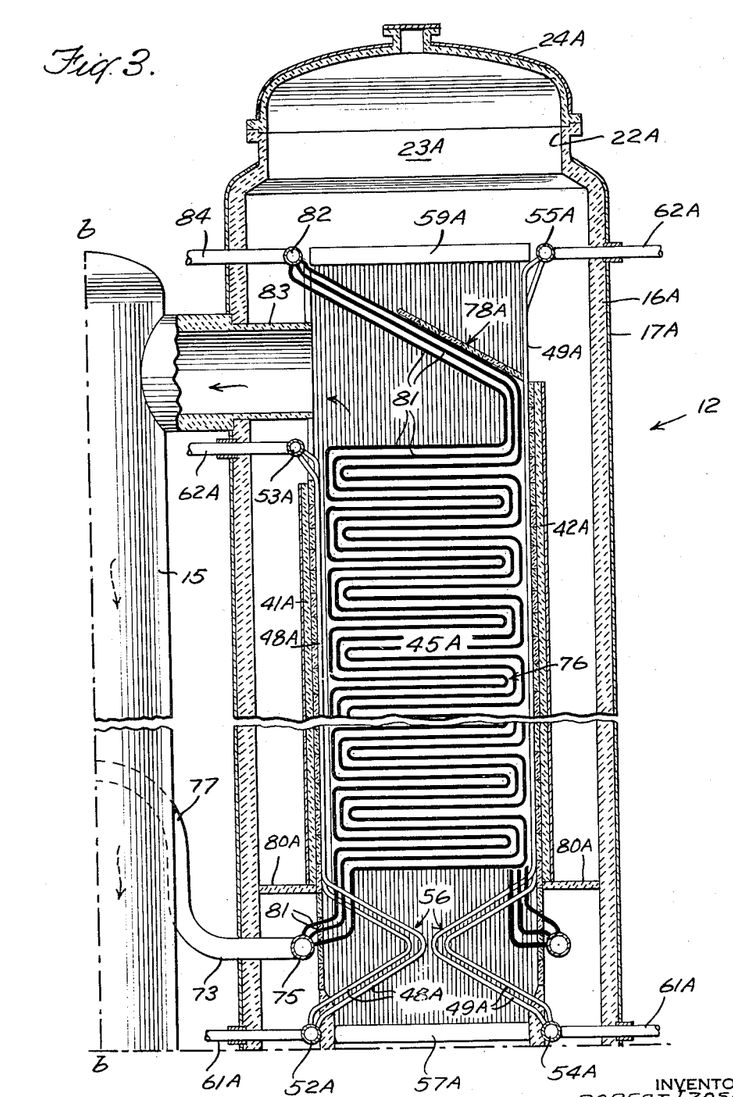
Fig. 3 is a longitudinal sectional view taken through the secondary superheater vapor generator and joined to Fig. 2 along line b—b.

Superheater 64 comprises a plurality of horizontally spaced rows of tubes 69 which are connected at their ends to an inlet header 70 which is disposed above reheater outlet header 66. Superheater tubes 69 project from inlet header 70 downwardly across convection passageway 45 parallel to reheater tubes 65 to wall 42 and thence parallel to wall 42 between the rows of reheater tubes 65. Below the lowermost horizontal straight portions of reheater tubes 65, superheater tubes 69 are formed into a plurality of horizontally extending, vertically spaced, straight portions which are connected together by return bends. From the lowermost straight portion of superheater tubes 69, the tubes project downwardly parallel to wall 41 and thence through wall 41 to a superheater outlet header 71. Steam is conducted from vapor and liquid drum 13 to superheater inlet header 70 by a feed pipe 72 which is connected to drum 13 to receive steam from the vapor space of the latter and to inlet header 70 to deliver steam thereto. As shown in Figs. 2 and 3, superheater outlet header 71 is connected to a pipe 73 which communicates at one end with outlet header 71 and at the opposite end with an inlet header 75 of a convection superheater 76 disposed in vapor generator 12. Pipe 73 is provided with a U-bend portion 77 (fully shown in Figs. 2 and 3) which allows for differential expansion and contraction between vapor generator 11 and vapor generator 12.

Reheater 63 and superheater 64 are of such size that they may be readily withdrawn from vapor generator 11 through access aperture 23 in the setting for inspection and replacement. The novel arrangement of the superheater tubes 69 with respect to the reheater tubes 65 enables removal and replacement of the superheater 64, through access aperture 23, without disturbing reheater 63 and vapor generating tubes 48, 49, 50 and 51. Likewise, reheater 63 may be withdrawn or replaced without disturbing superheater 64 and vapor generating tubes 48, 49, 50 and 51.

As shown, the upper inclined portion of superheater tubes 69 form a roof 78 across the top of convection passageway 45. Roof 78 also includes a refractory surface 79 which is joined to the top of wall 42 and extends between opposite walls 43 and 44 and along the top of superheater tubes 69 to a point short of wall 41. Adjacent the lower ends of walls 41, 42, 43 and 44 are disposed sealing walls 80 which extend between the walls and the inner periphery of setting wall 16 (see Figs. 2 and 4). Sealing walls 80 prevent combustion gas, flowing from furnace chamber 25, from bypassing convection passageway 45 and insure flow of combustion gas through the latter.

Vapor generator 12 is of essentially the same construction as herein described for vapor generator 11 and, therefore, will not be described in detail. However, the parts of vapor generator 12 which correspond to similar parts of vapor generator 11 will be designated by the same reference numeral except that the reference number will have a suffix A. Vapor generator 12 only differs from vapor generator 11 in that there is no reheater and only the superheater 76 is disposed within convection passageway 45A. Superheater 76 will be hereinafter referred to as the secondary superheater, the primary superheater being superheater 64 in vapor generator 11. Superheater tubes 81 of secondary superheater 76 extend from inlet header 75 upwardly within convection passageway 45A in a series of return bends, as superheater tubes 69 and reheated tubes 65, and are connected to an outlet header 82 which is disposed above a combustion gas outlet duct 83, similar to duct 46 of vapor generator 11. Outlet header 82 is connected via line 84 to deliver superheated steam to a place of use (not shown), such as a steam turbine.

In the twin vapor generators 11 and 12, of this invention, feed water is supplied to vapor and liquid drum 13 from an economizer unit 85 (Fig. 9) via feed water lines (not shown). In economizer unit 85 feed water is preheated by passing in indirect heat exchange relationship with combustion gas exhausted from gas turbine and compressor assembly 14. Water flows from vapor and liquid drum 13 by way of the pairs of downcomers 38 and 38A. A portion of the water in downcomers 38 and 38A passes into distribution pipes 39 and 39A, respectively, and then into ring-shaped inlet header 36 and a similar header not shown in vapor generator 12. The water then flows upwardly in vapor generating tubes 35 of vapor generator 11 in indirect heat exchange relationship with combustion gas produced in furnace chamber 25 by combustion of fuel emitted therein by burners 29. Saturated steam generated in tubes 35 pass into outlet header 37 and thence via riser pipes 40 into vapor and liquid drum 13. Similarly, the saturated steam generated in the vapor generating tubes in the furnace chamber of vapor generator 12 flows via riser pipes 40A into vapor-liquid drum 13. Simultaneously, with the circulation of water into and through vapor generating tubes of the furnace chambers of vapor generators 11 and 12, another portion of the water flowing from drum 13 via downcomers 38 and 38A passes into distribution pipes 61 and 61A. From pipes 61 and 61A, the water flows into inlet headers 52, 54, 57 and 58 (Figs. 2 and 5) and into inlet headers 52A, 54A, 57A and 58A (Fig. 3), respectively. The water then rises upwardly through vapor generating tubes 48, 49, 50 and 51 of vapor generator 11 and upwardly through vapor generating tubes 48A, 49A, 50A and 57A of vapor generator 12 in indirect heat exchange relationship with combustion gas flowing through the respective convection gas passages 45 and 45A of vapor generators 11 and 12 and into their respective outlet headers 53, 55, 59 and 60 of vapor generator 11 and outlet headers 53A, 55A, 59A and 60A of vapor generator 12. From each of the aforementioned outlet headers saturated steam flows to the vapor and liquid drum 13 by way of riser lines 62 and 62A.

Saturated steam from drum 13 passes into the inlet header 70 of primary superheater 64, via line 72. The steam then passes into and downwardly through superheater tubes 69 to outlet header 71 in indirect heat exchange relationship with combustion gases flowing through convection passageway 45. The heated steam passes from outlet header 71 into pipe 73 and into the inlet header 75 of secondary superheater 76 in vapor generator 12 (Fig. 3). Thereafter, steam is further heated by flowing upwardly in superheater tubes 81 in indirect heat exchange relationship with combustion gases flowing through convection passageway 45A of vapor generator 12. Steam heated to a predetermined desired temperature in superheater tubes 81, passes into outlet header 82 and thence to a place of use, as for example a steam turbine, via line 84. Downward temperature control of final superheated steam temperature is achieved by injecting water, which may be feedwater or condensate, into the superheated steam flowing from the primary superheater 64, by means of a liquid injection apparatus 86 (Fig. 2) disposed in line 73, which line interconnects primary superheater 64 with secondary superheater 76.

Steam to be reheated flows from a source of steam, such as a steam turbine, through line 68 into reheater inlet header 67 and thence upwardly through reheater tubes 65 to outlet header 66 in indirect heat exchange relationship with combustion gas flowing through convection passageway 45. From outlet header 66, the reheated steam passes to a place of use, such as a low pressure steam turbine, by way of line 74.

Although, flow of steam through reheater 63 has been described as flowing parallel to the combustion gas flow through convection gas passageway 45, it is within the contemplation of the present invention to provide flow of steam to be reheated in a direction countercurrent to the flow of combustion gas. Likewise flow of steam to be superheated may be provided parallel to the flow of combustion gas in convection gas passageway 45 of vapor generator 11 while flow of steam to be superheated may be countercurrent to flow of combustion gas through convection gas passageway 45A of vapor generator 12 without departing from the spirit and scope of the present invention.

Combustion of fuel in vapor generators 11 and 12 is effected by supplying fuel to burners 29, from a suitable source of fuel by way of feed lines 33. Combustion air under relatively high pressure is conducted from a suitable source of compressed air, such as gas turbine and compressor assembly 14, via ducts 34 and 34A to the burners of the respective vapor generators 11 and 12. The products of combustion flow upwardly, through the furnace chambers of each of the vapor generators and through the convection passageways to gas outlet ducts 46 (Fig. 2) and 83 (Fig. 3). The combustion gas from convection passageways 45 and 45A flow, through outlet ducts 46 and 83, into combustion gas duct 15 and into admixture with each other.

As best shown in Figures 1, 2A, 7 and 8, combustion gas duct 15 extends downwardly between vapor generators 11 and 12 and then horizontally and parallel to foundation 18 to a point adjacent the gas turbine and compressor assembly 14. Disposed in combustion gas duct 15 is an afterburner or combustor 90 of any suitable design having a burner (not shown) which is connected to receive fuel for combustion within afterburner 90. Air to support fuel combustion within afterburner 90 is supplied as hereinafter described.

Gas turbine and compressor assembly 14 comprises a gas turbine 91 and an air compressor 92 which is coupled to the gas turbine and is driven by the latter. Gas turbine 91 is also coupled to drive apparatus for delivering useful external power, as for example, an electric generator 93. The inlet of the gas turbine communicates with combustion gas duct 15, through an inlet duct 94, to receive combustion gas under a predetermined temperature and mass flow. As previously indicated, compressed air is delivered to vapor generators 11 and 12 by combustion air feed pipes 34 and 34A which are connected at one end to the outlet or pressure side of compressor 92 and at their opposite ends, through setting bottoms 21 and 21A, respectively, of vapor generators 11 and 12, to plenum chamber casings 30 of the vapor generators.

Figure 8:
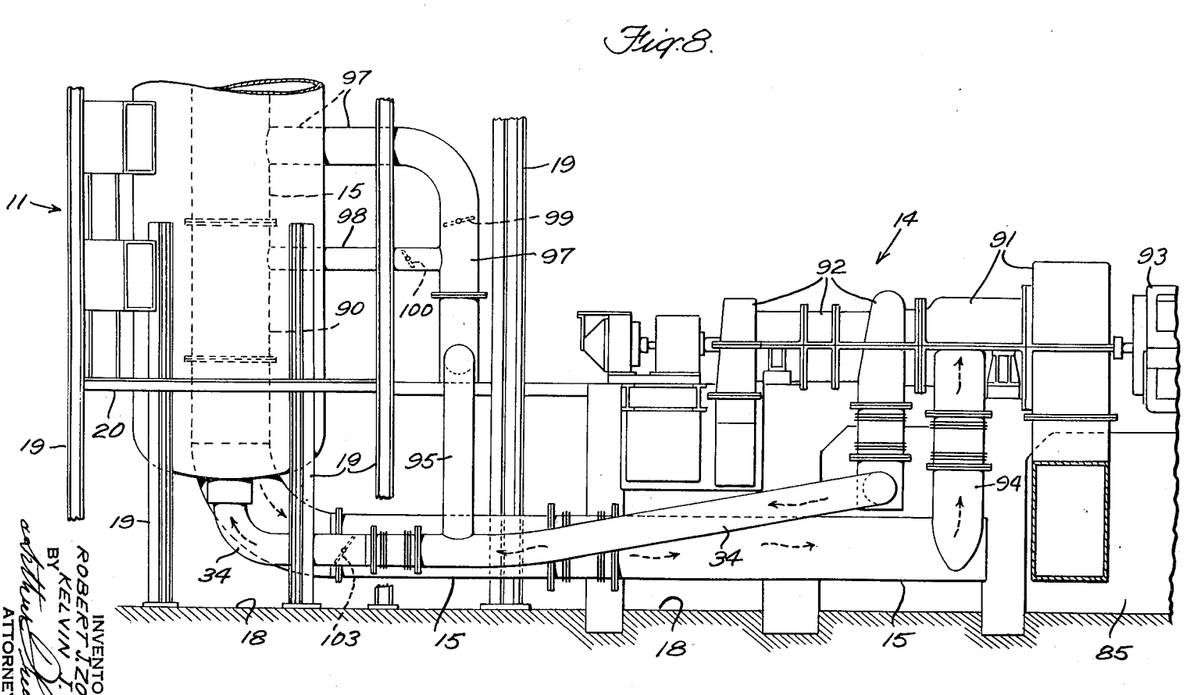
Fig. 8 is a fragmentary view in side elevation of the power plant showing the connections between the supercharged vapor generators and the gas turbine and compressor assembly.
Figure 9:
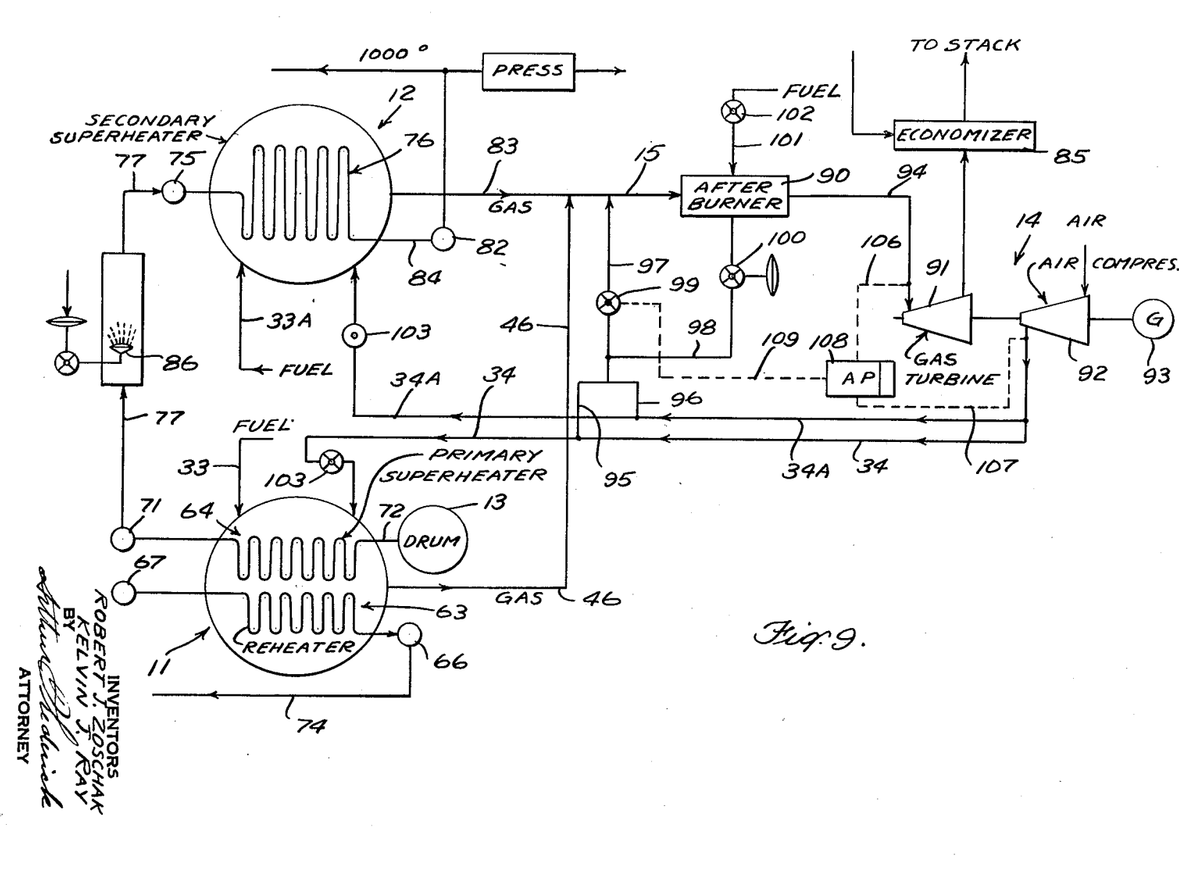
Fig. 9 is a schematic diagram showing the interconnections of the vapor generators and the gas turbine and compressor assembly according to this invention and as shown in Figs. 7 and 8.

As shown in Figs. 7, 8 and 9, two lines 95 and 96 are connected, respectively, to feed pipes 34 and 34A and extend vertically from the latter pipes and are connected at their opposite ends to a vertically disposed pipe 97. Pipe 97 is connected to combustion gas duct 15 upstream of afterburner 90 (see Fig. 3). A line 98 is connected at one end to the pipe 97 and at the opposite end to afterburner 90 to supply the latter with combustion air. Flow of combustion air through pipe 97 is controlled by a valve 99 while flow of combustion air through line 98 is regulated by a valve 100 (see Fig. 9). Valves 99 and 100 may be of any suitable type, as for example, damper or butterfly valves.

Figure 10:
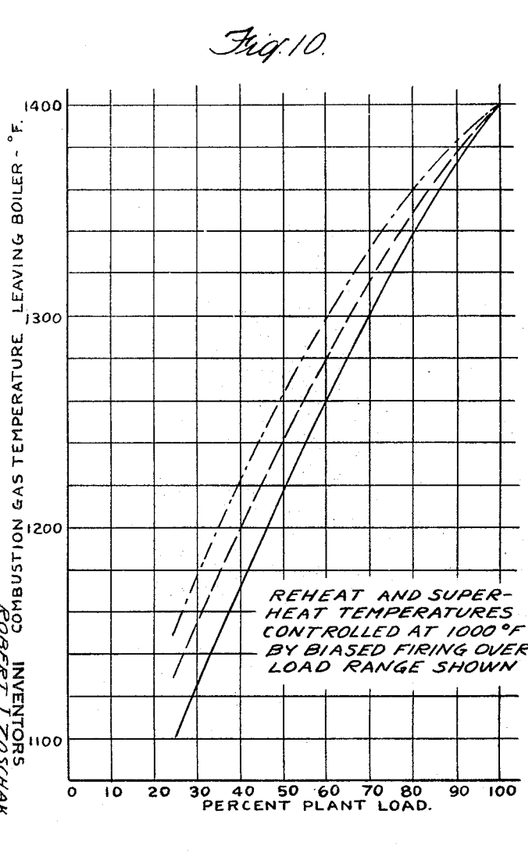
Fig. 10 is a graph showing the relationship of combustion gas temperature leaving the vapor generators in relation to power plant load; and, Fig. 11 is a graph illustrating fuel flow and air fuel ratio for the vapor generators in relation to the power plant load.

Operation of the steam and gas cycle power plant 10, according to this invention, can best be understood when explained in connection with Figures 9, 10 and 11. Under full plant load combustion air from compressor 90 is equally distributed to pipes 34 and 34A which pipes conduct the combustion air to vapor generators 11 and 12, while fuel load to the burners of the vapor generators 11 and 12, through fuel feed lines 33, is also equally balanced. With combustion air flow and fuel load to each vapor generator equal, the desired quantity of steam is generated as well as providing final superheat steam temperature and reheat steam temperature at the desired predetermined maximum values, as for example, 735, 600 lbs. of superheated steam per hour at 1800 p.s.i.g. and at 1000° F. and 662,088 lbs. of reheated steam per hour at 425 p.s.i.g. at 1000° F. The steam is generated, superheated and reheated in vapor generators 11 and 12 as hereinbefore described. At full load demand and with combustion air flow and fuel load to each vapor generator as aforedescribed, combustion gas discharges from each of the vapor generators by way of outlet ducts 46 and 83 and into admixture with each other in combustion gas duct 15 and enters the afterburner 90 at a temperature; as for example, 1400° F., which is slightly below the predetermined maximum temperature value desired at the inlet of gas turbine 91. To raise the combustion gas temperature to the predetermined maximum value, fuel is introduced into afterburner 90 by way of line 101 (Fig. 9) and air to support combustion in the afterburner is conducted to the latter from pipes 34 and 34A by way of lines 95, 96 and 98. Fuel and air is introduced in controlled amounts, the amount of air being controlled by valve 100 in line 98 and the amount of fuel being controlled by a suitable valve means 102 in line 101 so that combustion gas flow delivered through inlet duct 94 to the inlet of the gas turbine 91 is elevated at said gas turbine inlet to the predetermined maximum temperature value, as for example, 1450° F.

Figure 11:
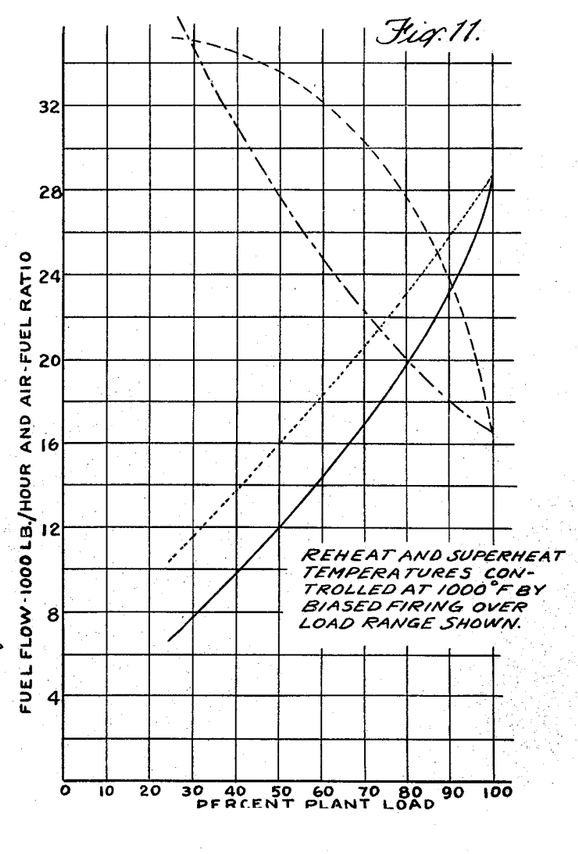

Upon reduced plant load operation of the power plant 10, steam requirements are less than at full plant load operation and, therefore, the fuel load to vapor generators 11 and 12 through fuel feed lines 33 and 33A, as shown by the fuel flow curve on the graph of Fig. 11, is reduced to meet the reduced steam load. In addition, the flow of combustion air to the vapor generators 11 and 12 through pipes 34 and 34A is reduced by operation of valves 103 in each of those lines. However, the air to fuel ratio in both vapor generators is increased to maintain superheat and reheat steam temperatures at the predetermined maximum values, as shown in the graph of Figure 11. In the graph of Figure 11, the full line and dotted line represent the fuel flow to the respective burners of vapor generators 11 and 12 in relation to load on the power plant, while the broken line and the dot and dash line show the air to fuel ratio to the respective burners of vapor generators 11 and 12 under various loads on the power plant. As can be seen from the graph, at 60 percent plant load to maintain superheat and reheat steam temperatures at the desired predetermined values, the fuel flow to vapor generator 11 is approximately 14,250 lbs. per hour while the fuel flow to vapor generator 12 is about 18,000 lbs. per hour. The air to fuel ratio at 60 percent plant load is increased from that at full plant load to approximately 32.5 lbs. of air to 1 lb. of fuel for vapor generator 11 and about 25 lbs. of air to one lb. of fuel for vapor generator 12. With reduced fuel load and reduced combustion air flow to vapor generators 11 and 12, the temperature of the combustion gas leaving the vapor generators 11 and 12 will be less than at full load so that the combustion gas at the turbine inlet will be below the desired predetermined maximum temperature value. As shown in Figure 10, upon reduced load on the power plant the temperature of the combustion gases leaving vapor generators 11 and 12 falls. In the graph shown in Figure 10, the solid line curve represents the temperature of the combustion gas leaving vapor generator 12, the dot and dash line shows the temperature of the combustion gas leaving vapor generator 11, and the broken line represents the temperature of the combustion gas mixture in duct 15, under various load conditions on the power plant. From the graph it can be seen that at 60 percent load on the power plant, the temperature of the combustion gas leaving vapor generator 11 will be at approximately 1300° F. while the combustion gas leaving vapor generator 12 will be around 1260° F., the temperature of the combustion gas mixture in gas duct 15, as shown by the broken line in the graph, being about 1280° F. To maintain the temperature of the combustion gas at the inlet of the gas turbine 91 at the predetermined value, as for example, 1450° F., a proportionate increase in flow of combustion air to afterburner 90 through valve 100 in line 98 and an increase in fuel feed to afterburner 90 through valve 102 in line 101 is provided. Upon further decrease in load on power plant 10, flow of combustion air to the vapor generators 11 and 12 through lines 34 and 34A is further reduced by further throttling of valves 103 in combustion air pipes 34 and 34A and the fuel feed to the burners of the vapor generator is further reduced. However, while combustion air and fuel load is reduced, the air to fuel ratio in each of the vapor generators is increased to maintain superheat and reheat steam temperatures at the desired values. Under these operating conditions, increased fuel load and combustion air load to afterburner 90 will be sufficient to maintain the temperature of the combustion gas at the inlet of gas turbine 91 at the predetermined maximum value, but the flow of combustion air through valve 100 in line 98 will be insufficient to maintain a predetermined mass flow of combustion gas to and through gas turbine 90. When this condition occurs, mass flow at the turbine inlet will decrease, and valve 99 is opened sufficiently to admit through lines 95, 96 and 97 the amount of air necessary to maintain mass flow of combustion gas at a predetermined value at the inlet of the gas turbine 91. This control is automatically achieved by a sensing device (not shown) at the inlet of gas turbine 90 and another sensing device (not shown) located at the outlet of compressor 92. These sensing devices are connected by lines 106 and 107 to a suitable controller 108 which controller is in turn connected by a line 109 to valve 99. Controller 108 actuates valve 99 in response to the change in differential pressure between the combustion gas at the inlet of gas turbine 91 and the combustion air at the outlet of compressor 92 as indicated by the sensing devices, so that, when mass flow of combustion gas at the gas turbine inlet deviates from the predetermined maximum value, as reflected by change in differential pressure, controller 108 actuates valve 99 to increase or decrease combustion air flow through lines 95, 96 and 97 to combustion gas duct 15. Thus, when combustion air flows through pipes 34 and 34A to vapor generators 11 and 12 and air flow through lines 95, 96 and 98 to afterburner 10 are not enough to provide the predetermined mass flow of combustion gas at the turbine inlet at reduced load on the power plant 10, valve 99 opens to bypass a greater proportion of combustion air from the vapor generators to combustion gas duct 15. The maintenance of a predetermined mass flow at the gas turbine may also be automatically controlled by a controller which is connected to a device for measuring flow or pressure at the compressor outlet so that if flow or pressure falls below a desired value the controller effects the opening of valve 99 to bypass compressed air into duct 15. The aforedescribed control means for sensing change in differential pressure between the inlet of the gas turbine and compressor outlet is preferred since it will react more quickly to achieve predetermined mass flow to the gas turbine.

As aforedescribed, reheat and superheat steam temperature under relatively low load operating conditions, are maintained by throttling air flow to vapor generators 11 and 12 through pipes 34 and 34A. This control is possible because excess compressed air is bypassed to duct 15, via lines 95, 96 and 97 to maintain mass flow of gas to and through gas turbine 91 which in turn drives air compressor 92 at full load. With air compressor output substantially constant, the proportion of the compressor output necessary for a particular air-fuel ratio to vapor generators 11 and 12 at low load conditions is delivered via lines 34 and 34A to the vapor generators. Under relatively low load conditions in absence of maintaining a predetermined maximum mass flow of gas and gas temperature to turbine 91, compressor output would fall off causing a fall off in compressed air delivered to vapor generators 11 and 12 which would in turn upset the air-fuel ratio required to maintain superheat and reheat temperatures at the predetermined maximum values.

Downward control of superheated steam temperature to maintain superheat temperature at the predetermined maximum value at full load on power plant 10 is achieved by apparatus 86 which injects water, such as feedwater or condensate, into the superheated steam leaving primary superheater 64.

Under start-up conditions of power plant 10 of this invention, gas turbine 91 can be quickly brought up to its design output and full output of electric generator 93 can be achieved by firing afterburner 90 and bypassing compressed air through lines 95, 96 and 97 to duct 15 thereby providing the predetermined maximum mass flow of gas and gas temperature to and through the gas turbine before combustion gas flow from vapor generators 11 and 12 reach the predetermined maximum temperature and mass flow values. In start-up operation, a starting motor (not shown) is connected to air compressor 92 to drive the compressor for maximum output until mass flow of gas and gas temperature reaches the predetermined maximum values by bypassing air through lines 95, 96 and 97 to duct 15 and firing afterburner 90.

Steaming condition in economizer 85 is prevented under start-up and low load operation (below 25 percent of full plant load) by a minimum-flow control means (not shown) which measures flow of water from the economizer and maintains this flow at a particular value by recirculating water to the condenser (not shown).

It is readily apparent from the foregoing description that a novel supercharged vapor generator has been provided and that an improved steam and gas turbine power plant, having dual supercharged vapor generators, has been disclosed. The supercharged vapor generators according to this invention provide a novel rectangular convection section within a cylindrical setting in combination with convention reheater and superheater units whereby the reheater and superheater units are of relatively simple and inexpensive construction. The invention also provides a novel arrangement of the reheater and superheater units with respect to each other whereby one or the other is removable from the convection section and setting without disturbing the other or other pressure parts of the vapor generators. The steam and gas turbine power plant of this invention achieves control of superheat and reheat steam temperatures as well as combustion gas temperature at the inlet of a gas turbine at predetermined maximum values over a very wide range of load on the plant. Mass flow of combustion gas to the gas turbine is also maintained at a predetermined value over an extremely wide range of load on the power plant whereby high plant efficiency and flexibility of operation is achieved.

Although but one embodiment of the invention has been illustrated and descirbed in detail, it is to be expressly understood that the invention is not limited thereto. Various changes can be made in the arrangement of parts without departing from the spirit and scope of the invention, as the same will now be understood by those skilled in the art.

What is claimed is:

1. In a gas-steam cycle power plant including steam turbines and at least one gas turbine with a steam generator having fuel burning means, both steam and gas turbines being adapted for delivering useful external power, the combination of an air compressor having an air inlet and an air outlet and driven by the gas turbine, pipe means communicating with the air outlet of said air compressor and the fuel burning means of the steam generator to respectively receive combustion air under pressure and deliver the same to the fuel burning means, duct means communicating with the steam generator to receive combustion gas from the latter and with the gas turbine to deliver combustion gas to the gas turbine, a combustion chamber disposed within said duct means and having a fuel burner, a line in communication at one end with said pipe means and at the opposite end with the combustion chamber to deliver sufficient combustion air for combustion of fuel within the combustion chamber to thereby elevate the combustion gas temperature at the turbine inlet to a predetermined value, second pipe means in communication with the duct means upstream of the combustion chamber and said first pipe means to supply combustion air to said duct means under reduced load on said power plant, and valve means for bypassing combustion air to said duct means in an amount necessary to maintain a predetermined mass flow of combustion gas through said turbine.

2. In a gas-steam cycle power plant including steam turbines and at least one gas turbine, both steam and gas turbines being adapted for delivering useful external power, the combination of a first steam generator having a furnace and fuel burners therein for producing combustion gases in said furnace, a second steam generator having a furnace and burners therein for producing combustion gases in said furnace, an air compressor having an air inlet and an air outlet and driven by the gas turbine, pipe means communicating with the air outlet of said compressor with the furnace of said first and second steam generators to deliver combustion air under pressure to said furnaces, duct means communicating with each of said first and second steam generators to receive combustion gas from each of the latter and communicating with the inlet of said gas turbine to deliver combustion gas to the latter, an afterburner disposed within said duct means and having a burner means for firing fuel therein, a valved line communicating at one end with said pipe means and at the opposite end with said afterburner to respectively receive and deliver controlled amounts of combustion air to the afterburner for combustion of fuel within the afterburner whereby the combustion gas temperature at the gas turbine inlet is elevated to a predetermined value, second pipe means in communication with the duct means and said first pipe means to supply combustion air to said duct means under reduced load on said power plant, and valve means in said second pipe means operative in response to a change in differential pressure between the combustion gas at the turbine inlet and the combustion air at the compressor outlet for controlling combustion air flow to said duct means to thereby maintain a predetermined mass flow of combustion gas into and through said gas turbine.

3. In a gas-steam cycle power plant including steam turbines and at least one gas turbine, both steam and gas turbines being adapted for delivering useful external power, the combination of a first steam generator having a furnace and fuel burners for producing combustion gases in said furnace, said first steam generator having a primary superheater disposed in heat exchange relationship with combustion gas generated in said first vapor generator, a second steam generator having a furnace and fuel burners for producing combustion gases in said furnace, said second steam generator having a secondary superheater connected to receive heated steam from said primary superheater and disposed in heat exchange relationship with combustion gases generated in said second vapor generator, a steam and water drum connected to deliver steam to said primary superheater, said secondary superheater being in communication with the steam turbines to deliver superheated steam to the latter, an air compressor having an air inlet and an air outlet and driven by the gas turbine, pipe means communicating with the air outlet of said compressor with each of the furnaces of said first and second steam generators to deliver combustion air under pressure to said furnaces, duct means communicating with each of said first and second vapor generators to receive combustion gas from each of the latter vapor generators and communicating with the inlet of said gas turbine to conduct combustion gas to the latter, an afterburner disposed within said duct means and having a burner means for firing fuel therein, a valved line communicating at one end with said pipe means and at the opposite end with said afterburner to respectively receive and deliver controlled amounts of combustion air to the afterburner for combustion of fuel within the afterburner whereby the combustion gas temperature at the gas turbine inlet is elevated to a predetermined value, second pipe means in communication with the duct means and said first pipe means to supply combustion air to said duct means under reduced load on said power plant, and valve means in said second pipe means operative in response to a change in differential pressure between the combustion gas at the turbine inlet and the combustion air at the compressor outlet for controlling combustion air flow to said duct means to thereby maintain a predetermined mass flow of combustion gas into and through said gas turbine.

4. In a gas-steam cycle power plant including steam turbines and at least one gas turbine, both steam and gas turbines being adapted for delivering useful external power, the combination comprising a first steam generator having a furnace and fuel burners for producing combustion gases in said furnace, said steam generator having steam generating elements and a primary superheater and reheater elements exposed to the combustion gases generated in the steam generator, a second steam generator having a furnace and fuel burners for producing combustion gases in said furnace, said second steam generator having steam generating elements and secondary superheater elements exposed to the combustion gases generated in the steam generator, a steam and water drum connected to pass water into said steam generating elements of said first and second steam generators and to receive steam for the same, said primary superheater connected to receive steam from said steam and water drum for superheating the steam and connected to said secondary superheater elements to pass superheated steam to the latter for further heating of the superheated steam, said secondary superheater elements being connected to the steam turbines to deliver superheated steam to the latter, said reheater elements communicating with one of the turbines to receive steam and connected to another turbine to deliver reheated steam to the latter, an air compressor having an air inlet and an air outlet and driven by the gas turbine, pipe means communicating with the furnace of said first and second steam generators to deliver combustion air under pressure to said furnaces, duct means communicating with each of said first and second steam generators to receive combustion gas from each of the latter and communicating with the inlet of said gas turbine to deliver combustion gas to the latter, an afterburner disposed within said duct means and having a fuel burner for combustion of fuel therein, a valved line communicating at one end with said pipe and at the opposite end with said afterburner to respectively receive and deliver controlled amounts of combustion air to the afterburner whereby the combustion gas temperature at the gas turbine inlet is raised to a predetermined value, second pipe means in communication with the duct means and said first pipe means to supply combustion air to said duct means under reduced load on said power plant, and valve means in said second pipe means operative in response to a change in differential pressure between the combustion air at the turbine inlet and the combustion air at the compressor outlet for controlling combustion air flow to said duct means to thereby maintain a predetermined mass flow of combustion gas into and through said gas turbine.

5. In a gas-steam cycle power plant having a fuel fired supercharged steam generator and including an afterburner, steam turbines and at least one gas turbine connected to drive an air compressor, the method of operating said power plant to control superheated steam temperature, reheated steam temperature and combustion gas temperature and mass flow thereof at the gas turbine inlet at predetermined values over a wide range of load on said power plant, comprising the steps of passing combustion air under pressure from said air compressor and fuel to the steam generator for combustion to provide combustion gas at the steam generator outlet at a temperature slightly below the predetermined value and to provide superheated and reheated steam at a predetermined value, passing a portion of the combustion air from the air compressor and fuel to the afterburner for combustion of fuel within the latter, bringing the combustion gas into admixture with the combustion gas in the afterburner to provide for the combustion gas at the turbine inlet at the predetermined value, reducing the fuel load to said steam generator upon reduced load on the power plant and increasing the air to fuel ratio to the steam generator to maintain reheat and superheat temperatures at the predetermined values, increasing the fuel load and combustion air to the afterburner to maintain the temperature and mass flow of the combustion air at the predetermined values, and by-passing a sufficient amount of combustion air from the air compressor into admixture with the combustion gas flowing from the steam generator to maintain mass flow of combustion gas at the gas turbine inlet at the predetermined value.

6. In a gas-steam cycle power plant having two fuel fired supercharged steam generators and including an afterburner, steam turbines and at least one gas turbine coupled to drive an air compressor, the method of operating said power plant to control superheated steam temperature, reheated steam temperature and combustion gas temperature and mass flow thereof at the gas turbine inlet at predetermined values over a wide range of load in said power plant, comprising the steps of passing equal amounts of combustion air under pressure from the air compressor to each of the steam generators, passing fuel for combustion into each of the steam generators to provide combustion gas in each of the steam generators sufficient to provide superheated steam and reheated steam at the predetermined temperature values, bringing the combustion gas from each of the steam generators in admixture to provide combustion gas mixture at a temperature value slightly below the predetermined temperature value at the gas turbine inlet, passing a portion of the combustion air from the air compressor and fuel to the afterburner for combustion of fuel within the latter, passing the combustion gas mixture into admixture with the combustion gas in the afterburner to raise the temperature of the combustion gas at the turbine inlet to the desired predetermined value, reducing the fuel load to each of said steam generators upon reduced load on the power plant, increasing the air-fuel ratio to each of the steam generators to maintain reheat and superheat steam temperature at the predetermined value, increasing the fuel load and combustion air to the afterburner to maintain the temperature of the combustion gas and mass flow at the turbine inlet to the predetermined values, and by-passing combustion air from the air compressor into admixture with the combustion gas mixture flowing from the steam generators to maintain the mass flow of combustion gas at the gas turbine inlet at the predetermined value.

7. In a gas-steam cycle power plant having a fuel fired supercharged steam generator and including an afterburner, steam turbines and a gas turbine connected to drive an air compressor, the method of operating said power plant to control superheated steam temperatures and reheated steam temperatures at the steam turbines and combustion gas temperature and mass flow thereof at the gas turbine inlet at predetermined values over a wide range of load on said power plant comprising, the steps of flowing fuel from a source thereof, flowing a portion of the combustion air under pressure from the air compressor in sufficient amounts and in a predetermined air to fuel ratio to provide combustion gas for the generation of a predetermined amount of steam and the maintenance of superheat and reheat steam temperatures at predetermined values and to provide combustion gas at the steam generator outlet at a temperature slightly below the predetermined temperature value at the gas turbine inlet, passing another portion of the combustion air from the air compressor and fuel from a source thereof to the afterburner for the combustion of fuel therein, passing the combustion gas from the steam generators into admixture with the combustion gas generated in said afterburner to provide the combustion gas at the turbine inlet at the predetermined value, reducing the fuel load to the steam generator upon reduced load on the power plant and at the same time increasing the air to fuel ratio to the steam generators to respectively decrease the quantity of steam produced and to maintain reheat and superheat temperatures at the predetermined values, increasing the fuel load and combustion air flow to the afterburner to maintain the temperature and mass flow of the combustion air at the predetermined values, supplying additional quantities of combustion air from said compressor in accordance with the change in differential pressure between the combustion gas at the gas turbine inlet and the combustion air at the compressor outlet so as to maintain combustion gas mass flow at the gas turbine inlet at a predetermined value.

8. In a gas-steam cycle power plant including steam turbines and at least one gas turbine with a steam generator having fuel burning means, both steam and gas turbines being adapted for delivering useful external power, the combination of an air compressor having an air inlet and an air outlet and driven by the gas turbine, pipe means communicating with the air outlet of said air compressor and the fuel burning means of the steam generator to respectively receive combustion air under pressure and deliver the same to the fuel burning means, duct means communicating with the steam generator to receive combustion gas from the latter and with the gas turbine to deliver combustion gas to the gas turbine, a combustion chamber disposed within said duct means and having a fuel burner, a line in communication at one end with said pipe means and at the opposite end with the combustion chamber to deliver sufficient combustion air from combustion of fuel within the combustion chamber to thereby elevate the combustion gas temperature at the turbine inlet to a predetermined value; second pipe means in communication with the duct means upstream of the combustion chamber and said first pipe means to supply combustion air to said duct means under reduced load on said power plant, and valve means operative in response to changes in differential pressure between combustion gas pressure at the turbine inlet and combustion air pressure at the compressor outlet for bypassing combustion air to said duct means in amounts necessary to maintain a predetermined mass flow of combustion gas through said turbine.

References Cited in the file of this patent

UNITED STATES PATENTS

| | | |
|---|---|---|
| 1,952,542 | Ehlinger | Mar. 27, 1934 |
| 2,605,610 | Hermitte et al. | Aug. 5, 1952 |
| 2,631,932 | Patterson et al. | Mar. 17, 1953 |
| 2,633,144 | Nordström et al. | Dec. 22, 1953 |
| 2,672,850 | Loughin et al. | Mar. 23, 1954 |
| 2,752,899 | Kasak | July 3, 1956 |

FOREIGN PATENTS

| | | |
|---|---|---|
| 22,620 | Germany | June 7, 1956 |

UNITED STATES PATENT OFFICE
CERTIFICATE OF CORRECTION

Patent No. 2,946,187            July 26, 1960

Robert J. Zoschak et al.

It is hereby certified that error appears in the printed specification of the above numbered patent requiring correction and that the said Letters Patent should read as corrected below.

Column 4, line 49, for "at the" read -- and the --.

Signed and sealed this 11th day of April 1961.

(SEAL)
Attest:
ERNEST W. SWIDER
Attesting Officer

ARTHUR W. CROCKER
Acting Commissioner of Patents